United States Patent [19]
Kinomoto

[11] Patent Number: 5,165,679
[45] Date of Patent: Nov. 24, 1992

[54] SHEET MATERIAL CONVEYOR

[75] Inventor: Noboru Kinomoto, Kanagawa, Japan

[73] Assignee: Fuji Photo Film Co., Ltd., Kanagawa, Japan

[21] Appl. No.: 741,375

[22] Filed: Aug. 7, 1991

[30] Foreign Application Priority Data

Aug. 24, 1990 [JP] Japan .................................. 2-221073

[51] Int. Cl.$^5$ ............................................ B65H 29/24
[52] U.S. Cl. ................................... 271/197; 271/188; 271/240; 271/276
[58] Field of Search ............... 271/161, 188, 197, 209, 271/240, 276

[56] References Cited

U.S. PATENT DOCUMENTS 3,140,780  7/1964  Richert ..................... 271/197 X
4,030,727  6/1977  Jeschke ..................... 271/197 X

FOREIGN PATENT DOCUMENTS 59-190886  10/1984  Japan .

Primary Examiner—Richard A. Schacher
Attorney, Agent, or Firm—Sughrue, Mion, Zinn, Macpeak & Seas

[57] ABSTRACT

An apparatus for conveying sheets having various widths. The apparatus includes a hollow drum having a plurality of holes disposed on the outer circumferential surface thereof, a suction device for sucking air through the plurality of holes toward an interior of the drum, and a plurality of conveying belts wound on the hollow drum and adapted to be conveyed around the drum and in sliding contact therewith. The conveying belts are spaced apart from one another in the widthwise direction of the sheets so as to define gaps therebetween. Additionally, a plurality of spaced apart pressing belts are alternatingly disposed with respect to the conveying belts such that the pressing belts oppose the gaps between. In this manner, the widthwise ends of the sheets are contacted by the inside edges of a pair of conveying belts so as to convey the sheets in the proper direction.

9 Claims, 2 Drawing Sheets

SHEET MATERIAL CONVEYOR

BACKGROUND OF THE INVENTION

The present invention relates to an apparatus for conveying sheet materials so as to laminate two sheet materials to each other using a conveyor constituted by a hollow drum having holes disposed in a circumferential surface thereof, endless belts wound on the hollow drum so as to be driven to rotate in sliding contact with the hollow drum, and a suction device for sucking air out of the hollow drum.

As an image forming apparatus, there is a system in which an image is formed by laminating two sheet-like materials to each other. Examples of such a system include a system in which an exposed photosensitive material and an image reception material are laminated on each other so as to form an image on the image reception material, and a system in which an original and a photosensitive material is laminated on each other and the lamination is exposed to thereby form an image on the photosensitive material.

In such an image forming apparatus, when a sheet-like photosensitive material, an image-reception material, an original, and the like are conveyed to an image forming section, various kinds of conveyors are employed. For example, there are a roller-type conveyor in which nip rollers sandwich a sheet material therebetween and rotate to thereby convey the sheet material, and a belt-type conveyor in which a pair of belts sandwiching a sheet material therebetween are driven to thereby convey the sheet material. Further, as a modified example of the belt-type conveyor, there is a conveyor in which vacuum pressure is applied to a sheet material so as to closely adhere the sheet material to the belts to thereby convey the sheet material by the belts.

The last-mentioned conveyor is constituted by a hollow drum having holes disposed in a circumferential surface thereof, a plurality of endless belts wound on the hollow drum so as to be driven to rotate while being in sliding contact with the hollow drum, and a suction device for sucking air out of the hollow drum (hereinafter, this conveyor is referred to as "an air-suction-type conveyor"). The air is sucked out of the drum by the suction device so as to provide a vacuum inside the drum to thereby adhere the sheet material closely to the belts, and the belts are rotated to convey the sheet material.

In the case where sheet materials are conveyed by such a conveyor so that two sheet materials are laminated on each other, when the sheet materials are not conveyed in the proper direction, the sheet materials are respectively corrected by a correction device and then the two sheet materials are laminated on each other.

When a sheet material is conveyed by the air-suction-type conveyor various factors may cause variations in the rotational speed of the conveying belts so that the sheet material is curved in the conveying direction or biased left or right. Such factors include, for example, variations in the diameter of the shaft of the driving rollers or vibrations therein, variations in circumferential length and in thicknesses of the endless belts, or nonuniform load or variations in the circumference of the tension roller.

Further, sheet materials which tend to easily retain static electricity, or sheet materials having different rigidity characteristics are curved or biased in the left and right directions while the sheet materials are being conveyed. Specifically, in the image forming apparatus, if an original and a photosensitive material are laminated on each other without being corrected in the conveyance direction, accurate image formation is not performed. Therefore, not only is a proper image not obtained, but jamming of the sheet materials is caused in the image forming apparatus.

Further, the sheet materials are always closely adhered to the belts in the air-suction-type conveyor, so that even if the direction of conveyance of the sheet material is attempted to be corrected by a correction device, such attempt may not be successful so that the sheet materials may not be conveyed properly relative to the belts.

Accordingly, the direction of the sheet materials cannot always be corrected.

SUMMARY OF THE INVENTION

It is an object of the present invention to solve the problems described above, and to provide a sheet material conveyor in which displacement in direction, bias, etc. of sheet materials conveyed by an air-suction-type conveyor is prevented so that the sheet materials are properly conveyed.

The above and other objects of the present invention can be achieved by a sheet material conveyor for conveying a sheet material by use of a hollow drum having holes disposed in a circumferential surface thereof, a plurality of conveying belts wound on the hollow drum so as to be driven to rotate while in sliding contact with the hollow drum, and suction means for sucking air out of the hollow drum, characterized in that the plurality of conveying belts are provided so as to accord with various widthwise sizes of the sheet material.

The above objects of the present invention can be achieved also by a sheet material conveyor for conveying a sheet material by use of a hollow drum having holes disposed in a circumferential surface thereof, a plurality of conveying belts wound on the hollow drum so as to be driven to rotate while in sliding contact with the hollow drum, and suction means for sucking air out of the hollow drum, characterized in that pressing belts are alternatingly disposed with respect to the conveying belts so as to cooperate with the conveying belts so as to urge the sheet material thereagainst.

That is, the conveying belts are positioned corresponding to the widthwise size of a sheet material to be conveyed so that, for example, the widthwise end edges of the sheet material (the edges perpendicular to the conveying direction) come into contact with the inside surfaces of the conveying belt pairs, so that the sheet material is conveyed while it is restricted at its opposite side edges. Accordingly, the direction of the sheet material is never shifted or biased.

Further, the pressing belts for biasing the sheet material against the conveying belts in cooperation therewith are provided in an alternating manner with respect to the conveying belts, so that the sheet material is surely sandwiched by the conveying belts and the pressing belts. Accordingly, the direction of the sheet material is never shifted or biased.

Thus, in the image forming apparatus having the sheet conveyor according to the present invention, sheet materials can be properly conveyed, so that an image can be accurately formed, and jamming of the sheet materials can be prevented from occurring.

The recording system of the image forming apparatus having the device according to the present invention has no limit so long as the apparatus is of the type in which two sheet materials are laminated on to one another to thereby form an image.

As an image recording apparatus of this kind, for example, there is a copying apparatus in which an original and a photosensitive material are laminated on each other, and subjected to exposure, development, and fixing so that an image is formed on the photosensitive material.

As the photosensitive material, there is known, for example, a diazo-photosensitive material as disclosed in Japanese Patent Unexamined Publication No. Sho-59-190886, which has microcapsules containing diazonum salt and a group containing couplers and bases on a support. The photosensitive material is exposed so as to form a latent image corresponding to the original and is developed by heating.

DETAILED DESCRIPTION OF THE PREFERRED EMBODIMENTS

Referring to the accompanying drawings, an embodiment of the present invention will be described hereunder.

Figure 1:
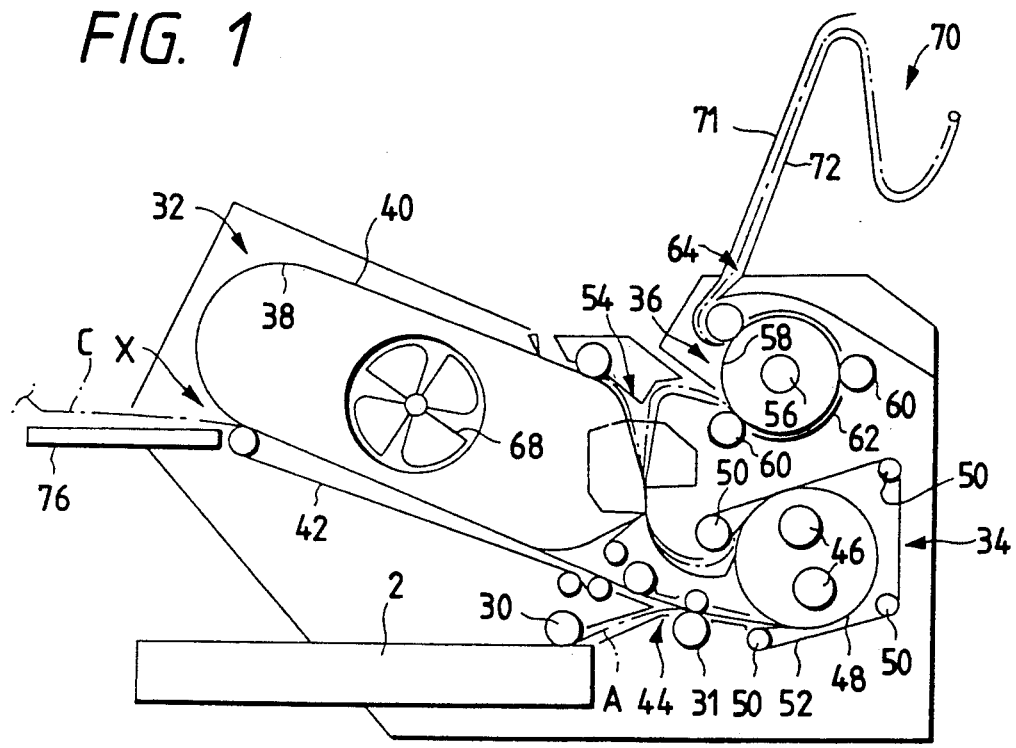
FIG. 1 is a schematic sectional view of a copying apparatus as an embodiment of the present invention.

FIG. 1 is a schematic view of a copying apparatus using a diazo-photosensitive material. The copying apparatus has an original conveying portion 32 for conveying and discharging an original C and for repeatedly circulating the same original C in the apparatus, an exposure portion 34 for exposing an image on a photosensitive material A laminated on the original C, and a developing portion 36 for heat-developing the exposed photosensitive material A.

The original conveying portion 32 is constituted by a plurality of upper conveying belts 40 disposed in parallel to each other around the circumferential surface of a hollow guide drum 38 and lower belts 42 disposed below confronting the upper belts 40. Both the belts 40 and 42 are rotationally driven so that they convey the original C while sandwiching the original C therebetween.

The original conveying portion 32 corresponds to the sheet material conveyor discussed above, according to the present invention. Additionally, the conveying belts 40 and the belt 42 correspond to the conveying belts and the pressing endless belts, respectively. Further, the original C corresponds to the sheet material. A cassette 2 housing the photosensitive materials A is mounted under the original conveying portion 32. The photosensitive materials A in the cassette 2 are individually fed to a lamination portion 44 by a paper feeding roller 30 simultaneously to the conveyance of the originals C so that the photosensitive materials A are individually laminated on the respective originals C successively. The photosensitive material A laminated on the original C is conveyed to the exposure portion 34 by conveying rollers 31.

The exposure portion 34 is constituted by an exposure drum 48 having fluorescent lamps 46 contained therein and a belt 52 supported by the exposure drum 48 and belt support rollers 50 and wound around the circumferential surface of the exposure drum 48 over a range of substantially ¾ thereof. While the exposure drum 48 and the belt 52 are rotationally driven so as to convey the original C and the photosensitive material A which are laminated on each other and sandwiched therebetween, an original image is projected on the photosensitive material A by the light emitted from the exposure drum 48, so that a latent image is formed thereon.

After being exposed, the original C and the photosensitive material A are sucked by suction means (not shown) in respective opposite directions so that they are separated from each other. After having been separated from the original C at a separating portion 54, the photosensitive material A is conveyed to the developing portion 36.

The developing portion 36 is constituted by a hollow cylindrical heating drum 58 having a halogen lamp 56 disposed therein and three conveying rollers contacting the circumferential surface of the heating drum 58. Guide members 62, which are in contact with the circumferential surface of the heating drum 58 so as to guide the photosensitive material A, are provided among the conveying rollers 60. While the photosensitive material A is being conveyed while being sandwiched between the heating drum 58 and the conveying rollers 60, the photosensitive material A is heated so as to be developed so that the latent image formed on the photosensitive material A is made visible.

The developed photosensitive material A is discharged upward through a discharge outlet 64. A stacker 70 is provided following the discharge outlet 64 so as to accommodate the photosensitive material A pushed upward along guides 71 and 72 in a curved manner.

On the other hand, the original C separated from the photosensitive material A is discharged outside the apparatus by the conveying belts 40 or is circulated along the guide drum 38 so as to be used for a subsequent copying process, as described above.

Figure 2:
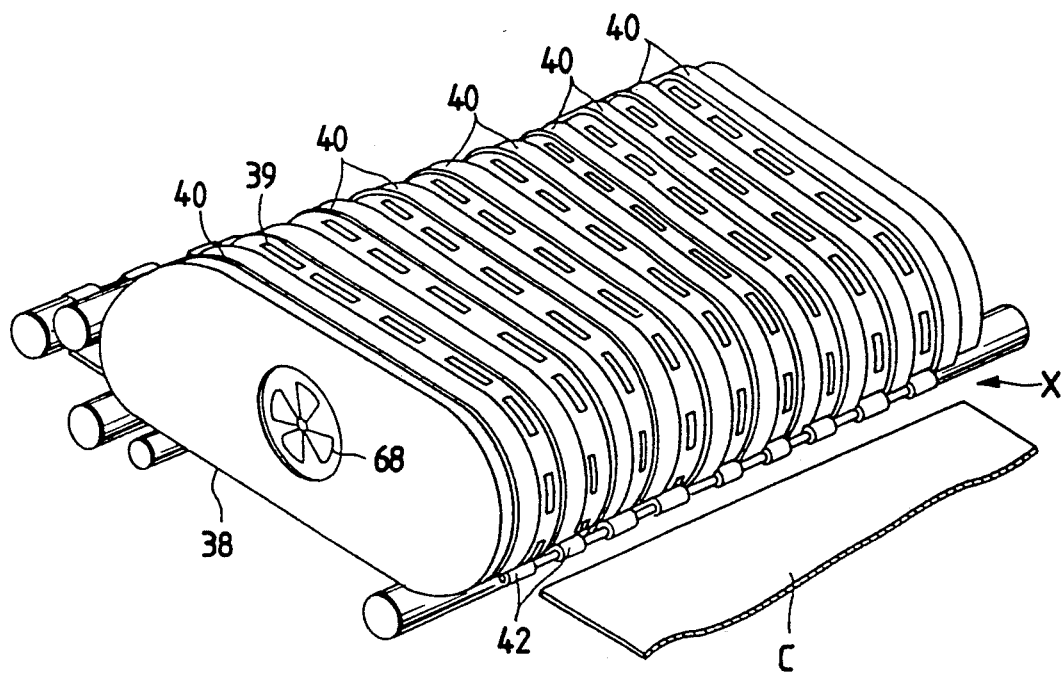
FIG. 2 is a perspective view of a conveyor according to the present invention.
Figure 3:
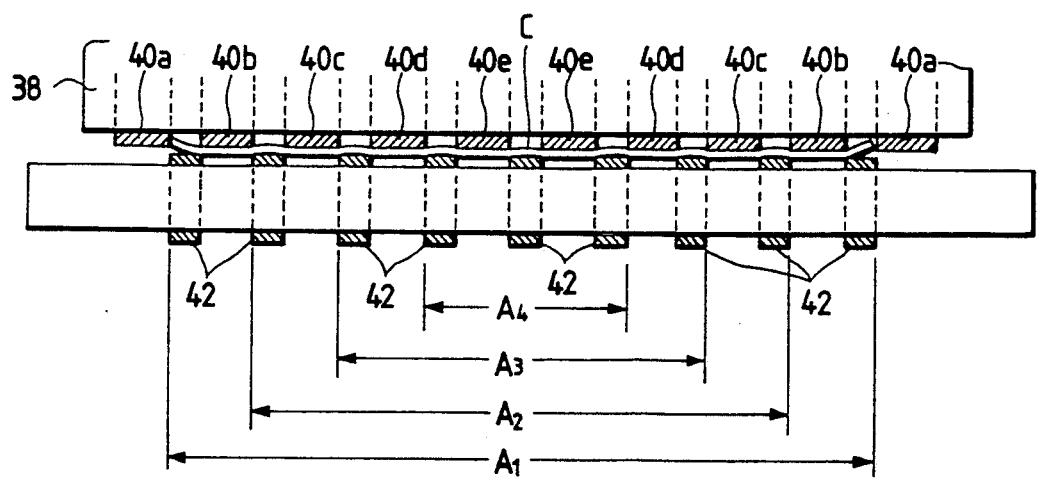
FIG. 3 is a sectional view of a main portion of the conveyor.
Figure 4:
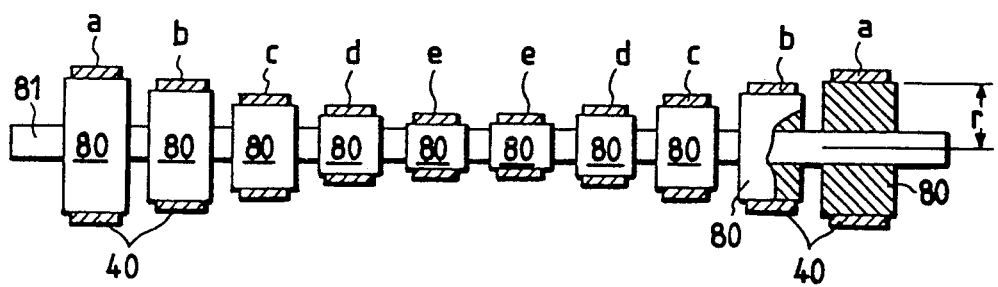
FIG. 4 is a plan view of a conveying belt.

Referring to FIG. 2-4, the original conveying portion 32 will be described hereunder. FIG. 2 is a perspective view of the original conveying portion 32, FIG. 3 is a sectional view of a main portion showing the relation between the conveying belts 40 and the pressing belts 42, and FIG. 4 is an explanatory view showing the drive of the conveying belts 40.

The guide drum 38 has a plurality of holes 39 formed around the outer circumferential surface and extending from the separating portion 54 to an original sending portion X, and further has a fan 68 for sucking air out of the guide drum 38. The fan 68 is driven to rotate so as to suck the air through the holes 39 and out of the guide drum 38, so that the original C is caused to closely adhere to the conveying belts 40. Specifically, the separated original C is caused to closely adhere to the conveying belts 40 by the vacuum created in the guide drum 38 and driving force is transmitted to the original C so that the original C is conveyed.

Although there may be a tendency for the direction of the original C to be altered while the original C is being circulated in the copying apparatus, the following various types of configurations are employed in this embodiment so that the original C is laminated on the photosensitive material A without being displaced or without being biased in one direction.

That is, as shown in FIG. 3, the conveying belts 40 are displaced from one another so as to have a space therebetween so that the opposite widthwise edges of the originals C touch the inside surfaces of respective ones of the conveying belts 40 so as to correspond to the width of each of the sizes A1 through A4 of the original C. On the other hand, the pressing belts 42 are disposed so as to be in opposition to the spaces formed between each of the conveying belts 40. Accordingly, when the original C is inserted from the original conveying portion X between the conveying belts 40 and the pressing belts 42, as shown in FIG. 2, for example, in the case where the original C has the size of A1, the opposite widthwise ends of the original C respectively contact the inside surfaces of the conveying belts 40a, as shown in FIG. 3, so that the widthwise position of the original C is restricted.

It is to be understood that the pressing belts 42 are alternatingly disposed with respect to the conveying belts 40 so as to oppose the spaces between the conveying belts 40, so that each of the opposite end portions of the original C is urged in between the conveying belt 40a and the conveying belt 40b, provided inside the conveying belt 40a, so that the original C cannot be displaced from this position even while it is being conveyed. Further, the original C also enters other gaps between adjacent ones of the conveying belts 40 (40b–40e), so that the original C is surely sandwiched by the conveying belts 40 and the pressing belts 42. Accordingly, the original C is sandwiched by the conveying belts 40 and the pressing belts 42 while the original C is restricted at its widthwise opposite ends, so that any shift in direction or bias of the original C can be prevented. Further, the original C is sandwiched in the curved state, so that the rigidity of the original C is increased in the conveying direction so that jamming rarely occurs.

Thus, the original C is conveyed to the lamination portion 44 in the positionally restricted state, so that the original C is laminated on the photosensitive material A without being displaced, and is conveyed to the following exposure portion 34.

The conveying operation of the original C described above is performed similarly in the cases where the size of the original C is smaller, for example, A2, A3, or A4. That is, as shown in FIG. 3, similarly to the case where the pair of conveying belts 40a are positioned so as to correspond to the size A1 original, the pair of upper conveying belts 40b are positioned so as to correspond to the size A2 original, the pair of upper conveying belts 40c are positioned so as to correspond to the size A3 original, and the pair of upper conveying belts 40d are positioned so as to correspond to the size A4 original. The pressing belts 42 are alternatingly disposed with respect to the conveying belts 40 so as to oppose the spaces between adjacent ones of the conveying belts 40. Therefore, a conveying operation similar to the above case is performed when an original is inserted from one of the positions designated for the respective sizes.

Although the above embodiment has a configuration for A-series sized originals C, the configuration may be made so that B-series originals C can be conveyed in the same manner as above.

Further, by increasing the number of the conveying belts 40 and pressing belts 42, the configuration may be arranged so that A-series originals C as well as B-series originals C can be similarly conveyed.

Preferably, marks corresponding to the respective sizes of originals to be inserted, or a pair of width-adjustable guide members are provided on an original stand 76 for guiding an original to the original conveying portion X so that the original to be entered is correctly conveyed between the conveying belts 40 in pairs provided corresponding to the size of the original.

However, while the original is being conveyed as described above, the original C is sometimes wrinkled substantially in the conveying direction. Thus, according to another embodiment, the driving speed of the conveying belts 40 is gradually increased from the inside toward the outside, in other words, from the conveying belts 40d toward the conveying belts 40a. The change in speed is performed by enlarging the radius r of the driving rollers for driving the conveying belts 40 from the inside toward the outside, as shown in FIG. 4.

That is, a shaft 81 is rotationally driven by a motor (not shown). The driving rollers 80 are fixed to the shaft 81 and spaced from each other so as to correspond to the spacing between the conveying belts 40. The radius of the sheet driving rollers 80 on which the conveying belts 40e are disposed is the smallest, and the radius is incrementally increased successively from the radius of the driving rollers 80 on which the conveying belts 40d are disposed to the radius of the driving rollers 80 on which the conveying belts 40a are disposed.

As a result, the rotational speed of the conveying belts 40e is the lowest, while that of the conveying belts 40a is the highest. Accordingly, when the original C having a size not smaller than the size A3 is conveyed, the conveying speed of the original C at its widthwise opposite end portions is high, while the conveying speed of the original C at its widthwise central portion is low, so that the original C is conveyed so as to be extended, or straightened, toward the widthwise opposite ends, so that wrinkles are prevented from occurring.

Further, each of the conveying belts 40 has a small frictional resistance against the guide drum 38 and a large frictional resistance against the original C so that the conveying belts 40 slidingly contact the guide drum 38 and positively contact the original C.

Further, each of the conveying belts 40 may be made of a carbon-mixed member, electrically conductive rubber, or the like so as to remove static electricity generated on the original C.

Although the embodiment has the configuration in which the original C is conveyed by an air-suction type conveyor, the present invention may be applied to a copying apparatus in which at least one of the originals C and the photosensitive material A is conveyed by the air-suction-type conveyor.

According to the present invention, conveying belts are positioned correspondingly to the widthwise size of a sheet material to be conveyed so that, for example, the widthwise end edges of a sheet material perpendicular to the conveying direction touch the inside surfaces of the conveying belts as a pair, so that the sheet material is conveyed while being restricted at its opposite side edges. Accordingly, the direction of the sheet material is never shifted or biased.

Further, pressing endless belts for biasing the sheet material against the conveying endless belts in cooperation therewith are provided in an alternating manner with respect to the conveying belts, so that the sheet material is sandwiched by the conveying belts and the pressing belts. Accordingly, the direction of the sheet material is never shifted or biased.

Accordingly, in the image forming apparatus provided with the sheet conveyor according to the present invention, sheet materials can be suitably conveyed, so that an image can be surely formed and jamming of the sheet materials can be prevented.

What is claimed is:

1. An apparatus for conveying sheets having various, predetermined widths, comprising:
    a hollow drum having a plurality of holes disposed on the outer circumferential surface thereof;
    suction means for drawing air in through said plurality of holes toward an interior of said drum;
    a plurality of conveying belts wound on said hollow drum and adapted to be driven around said drum in sliding contact therewith, said plurality of conveying belts being spaced apart from one another in a lateral direction of said sheets so as to define gaps between adjacent belts, the spacing of said belts being selected in accordance with the predetermined widths of said sheets such that two, nonadjacent ones of said belts are individually disposed proximate opposite lateral edges of a sheet during the conveyance thereof to thereby guide said sheet; and
    means for urging said sheets against said plurality of endless belts such that said sheets are conveyed thereby.

2. The conveying apparatus of claim 1 wherein said spacing is such that inner edges of said two belts are respectively disposed adjacent said lateral edges of said sheet such that said edges individually contact said inner edges and are guided thereby.

3. The conveying apparatus of claim 1 wherein said urging means comprises a plurality of spaced apart pressing belts alternatingly disposed with respect to said conveying belts such that said pressing belts oppose said gaps between said conveying belts.

4. The conveying apparatus of claim 1 wherein said suction means comprises a fan disposed in an end side of said drum, said fan sucking air out of said drum.

5. The conveying apparatus of claim 1, further comprising means for conveying said plurality of conveying belts around said drum at varying speeds, symmetrically opposite belts with respect to a center of said drum being conveyed at substantially the same speed as one another.

6. The conveying apparatus of claim 5 wherein the speed of conveyance of said belts with respect to a center of said drum increases from the center of said conveying apparatus to the outside thereof.

7. The apparatus of claim 6 wherein said conveyance means comprises a shaft adapted to be rotated and a plurality of driving rollers fixed to said shaft at positions respectively corresponding to the positions of said plurality of conveying belts.

8. The apparatus of claim 7 wherein the radius of a center pair of rollers by which a center pair of belts are conveyed is the smallest, the radius of symmetrically disposed pairs of rollers with respect to a center of said drum incrementally increasing toward the outside of said apparatus.

9. The apparatus of 1 wherein the frictional resistance of said conveying belts with respect to said drum is smaller than the frictional resistance of said conveying belts with respect to said sheets.

* * * * *